United States Patent [19]
Levine

[11] Patent Number: 4,695,205
[45] Date of Patent: Sep. 22, 1987

[54] PNEUMATIC CONVEYING SYSTEM
[75] Inventor: Marc S. Levine, Houston, Tex.
[73] Assignee: United DC, Houston, Tex.
[21] Appl. No.: 811,951
[22] Filed: Dec. 20, 1985
[51] Int. Cl.[4] .................. B65G 53/28; B65G 53/60
[52] U.S. Cl. .................................. 406/38; 406/106; 406/109; 406/171; 406/172; 406/173; 55/338
[58] Field of Search .................. 55/338; 406/106, 109, 406/168, 171, 172, 173, 175, 39, 38

[56] References Cited
U.S. PATENT DOCUMENTS

| | | | |
|---|---|---|---|
| 1,468,966 | 9/1923 | Herington | 406/106 |
| 2,276,805 | 3/1942 | Tolman, Jr. | 406/172 |
| 2,814,531 | 11/1957 | Murray, Jr. | 406/106 |
| 3,077,365 | 2/1963 | Fisher | 406/109 X |
| 3,236,565 | 2/1966 | Kester et al. | 406/173 |
| 3,694,037 | 9/1972 | Feder | 406/106 |
| 3,709,562 | 1/1973 | Feder | 406/173 X |
| 3,809,438 | 5/1974 | Hubbard | 406/106 |
| 4,284,372 | 8/1981 | Smith | 406/106 |
| 4,422,809 | 12/1983 | Bonin | 406/106 X |

FOREIGN PATENT DOCUMENTS

| | | | |
|---|---|---|---|
| 2102928 | 8/1972 | Fed. Rep. of Germany | 406/172 |
| 750830 | 6/1956 | United Kingdom | 406/109 |
| 871651 | 6/1961 | United Kingdom | 406/106 |

Primary Examiner—Andres Kashnikow
Assistant Examiner—Mary Beth O. Jones
Attorney, Agent, or Firm—Pravel, Gambrell, Hewitt, Kimball & Krieger

[57] ABSTRACT

A closed loop method and apparatus for unloading particulate materials from a transport container into a supply bin is disclosed. Material is conveyed from the discharge manifold of the transport container via vacuum into a transfer unit. The transfer unit has a vacuum zone and a pressure zone. The material is transferred from the vacuum to the pressure zone within the transfer unit and is conveyed via pressure to a cyclone separator mounted upon the supply bin. The particulate materials are separated in the cyclone separator and dropped into the supply bin. The overhead stream from the cyclone separator on top of the supply bin is returned to the discharge manifold on the transport container. Excess pressure developed in the supply bin is relieved into the transport container. Excess pressure in the transport container is filtered before being vented to the atmosphere.

20 Claims, 1 Drawing Figure

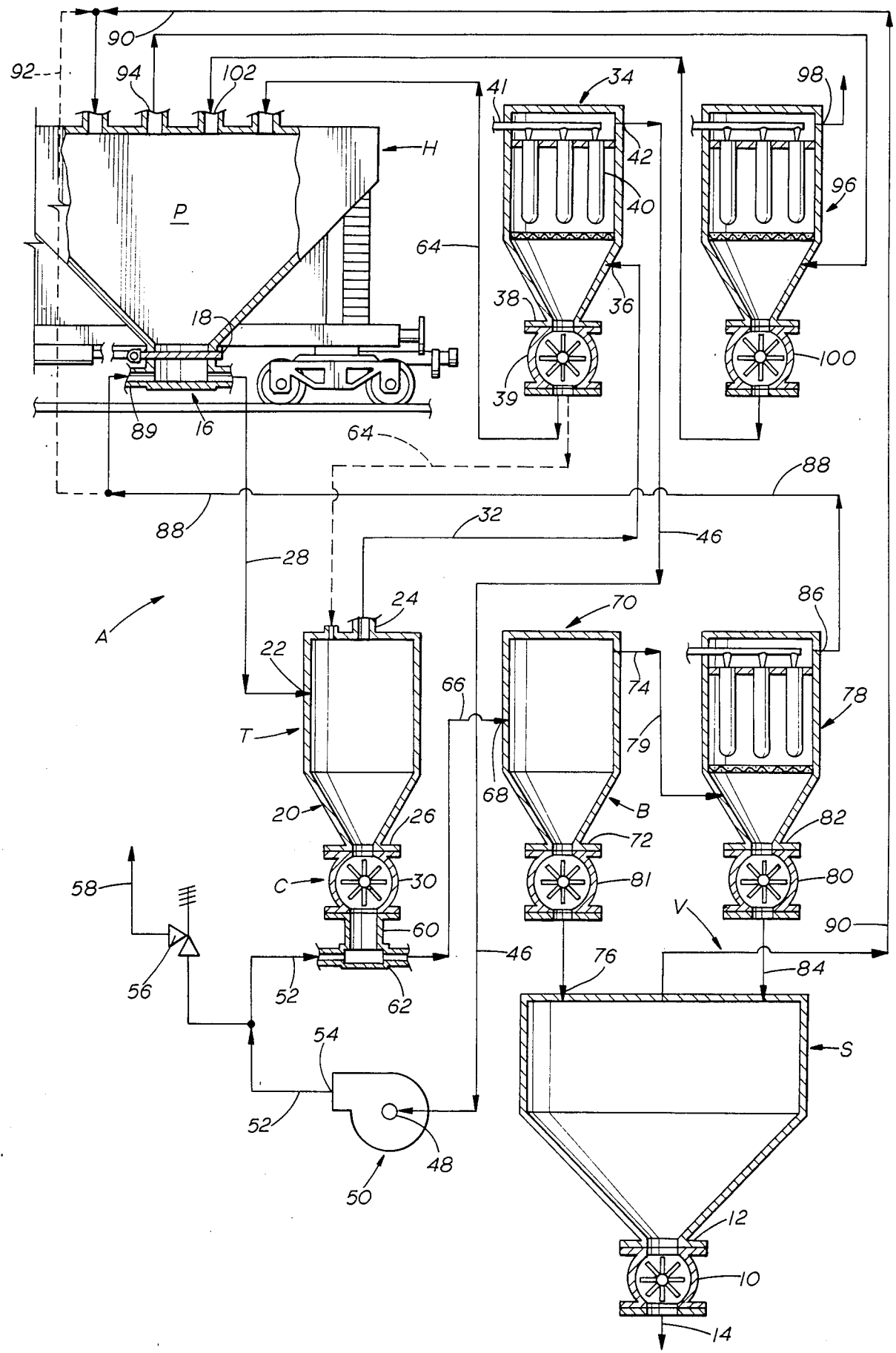

PNEUMATIC CONVEYING SYSTEM

FIELD OF THE INVENTION

The field of this invention relates to closed loop pneumatic conveying systems for transferring particulate materials from a transport container to a supply bin.

BACKGROUND OF THE INVENTION

Pneumatic conveying systems have been used to transfer the contents of bulk containers into in process storage hoppers or bins for further processing. In situations where non-dusty materials are being handled, open systems or semi-closed systems have been employed. These open systems essentially use the air once through for conveying purposes and discharge the conveying air from the system. A vacuum type open system is illustrated in FIG. 2 of U.S. Pat. No. 3,809,438. A pressure type open system is illustrated in U.S. Pat. No. 4,284,372. In both such systems, air or another conveying medium is taken into the system at one point, used to convey the materials and is allowed to exit the system after the conveyed materials have been discharged into a receiving receptacle.

Closed loop systems have been developed for transferring materials from bulk storage containers into storage bins. These systems are necessary for bulk users of granular or powdered materials who obtain such materials by shipments in bulk containers such as railroad hopper cars or hopper trucks.

The hopper cars or trucks have been unloaded by connecting a vacuum source to a product outlet on the underside of the bulk transfer container. The discharge header of the hopper car or truck was connected to a centrifugal cyclone separator. The overheads from the cyclone separator were piped into an inlet of a fan or blower while the particulate discharge connection on the cyclone separator was connected into the storage container or bin for further processing. The discharge of the fan of blower was directed back to the discharge manifold of the railroad hopper car or truck.

These types of systems suffered from several disadvantages. For one, the use of vacuum to unload railroad hopper cars required relatively short distances between the hopper truck or car being unloaded and the in-process storage bin to which the contents would ultimately be transferred. Additionally, maintaining the proper pressure and vacuum zones within the circuit required use of in line devices which would tend to cause plugging problems with resulting system downtime. One of such closed circuit pneumatic conveying systems is U.S. Pat. No. 3,694,037, wherein the balancing problem between the pressure and vacuum zones within the circuit is illustrated. In U.S. Pat. No. 3,694,037, the fan discharge line required a pressure relief connection with a filter sock mounted to it as well as an inline restriction to control the transition point between pressure and vacuum.

Another shortcoming of the closed loop systems used in the past was that significant amounts of the material being conveyed would not be sufficiently separated by the cyclone and would thus have to be processed through the circulating fan. Certain conveying systems adopted specially designed fans with separate dust recirculation lines to attempt to minimize the amount of dust flowing through the system fan or blower. One such system is illustrated in U.S. Pat. No. 3,809,438 (FIG. 1).

In many transfer operations involving the unloading of bulk containers, it was frequently necessary for operators to employ the same facilities to unload a wide variety of materials into separate storage containers. In using a closed loop system for products of different types, it was necessary to be able to insure adequate cleaning of the entire system in between products so as to avoid cross-contamination. Accordingly, the system had to be kept as simple as possible and as short as possible to facilitate proper washing of all the ducts and equipment in between products. As a result, complex equipment such as filter baghouses had to be eliminated since such equipment was difficult to effectively clean. Despite the requirement of easy cleaning which precluded the use of complex filtration devices, it was also desirable to minimize product losses from the transfer system for environmental as well as cost reasons.

The apparatus and method of the present invention address the problem of cross-contamination by employing few system elements each of which is readily cleanable. Furthermore, the apparatus and method of the present invention provide significant containment within the system of the material being transferred, thereby minimizing product losses.

SUMMARY OF THE INVENTION

A closed loop method and apparatus for unloading particulate materials from a transport container into a supply bin is disclosed. Material is conveyed from the discharge manifold of the transport container via vacuum into a transfer unit. The transfer unit has a vacuum zone and a pressure zone. The material is transferred from the vacuum to the pressure zone within the transfer unit and is conveyed via pressure to a cyclone separator mounted upon the supply bin. The particulate materials are separated in the cyclone separator and dropped into the supply bin. The overhead stream from the cyclone separator on top of the supply bin is returned to the discharge manifold on the transport container. Excess pressure developed in the supply bin is relieved into the transport container. Excess gas in the transport container is filtered before being vented to the atmosphere.

BRIEF DESCRIPTION OF THE DRAWING

The drawing schematically shows the apparatus and method of the present invention illustrating how particulate material is tranferred from a transport container into a supply bin.

DESCRIPTION OF THE PREFERRED EMBODIMENT

The apparatus A and method of the present invention are illustrated in the figure. A transport container H contains a particulate material P therein. The transport container can be a hopper car, hopper truck, or other suitable bulk container which can be transported by known means to a desired site. Transport container as used herein is also intended to encompass stationary storage containers used in a specific plant location. The transport container is unloaded, using the apparatus and method of the present invention, into a supply bin S for further processing. The supply bin S is mounted anywhere within the plant facilities of a particular location. A rotary valve or equivalent 10 is preferably mounted to the outlet 12 of supply bin S. Those skilled in the art will appreciate that other volumetric feeding devices can be used at outlet 12 without departing from the spirit of the invention. The particulate material which has accumulated in supply bin S is discharged through outlet 12 for further processing or repackaging. Such repackaging or processing steps are schematically represented by arrow 14.

The transport container H has a discharge manifold 16 adjacent its lower end. The term discharge manifold encompasses a header as well as a singular connection adapted to receive suitable conveying piping. An adjustable opening device such as a slide gate 18 is disposed between discharge manifold 16 and the remainder of transport container H. Adjustment of the material flow opening using slide gate 18 or equivalent devices, is one of the elements which control the effective rate of unloading particulate material P from transport container H.

Transfer unit means T preferably comprises a centrifugal cyclone separator 20. Other types of mechanical separators can be used without departing from the spirit of the invention. Separator 20 has an inlet 22, a fluid outlet 24 and a particulate material outlet 26.

Conduit 28 extends from one end of discharge manifold 16 to inlet 22. Conveying means C preferably comprising a rotary valve or other type of material flow control device 30 is mounted to particulate material outlet 26. The purpose of rotary valve 30 is to isolate the vacuum side of transfer unit means T from the pressure side.

In systems where principally one product is being unloaded thereby eliminating the problem of cross-contamination from different materials, fluid outlet 24 is connected via conduit 32 to filter 34. Filter 34 may be any one of many dry type mechanical separation devices or a wet type separation device depending on the material being process. In systems handling only one material, the preferred type of filter, as illustrated in the figure is a baghouse with a reverse pulse cleaning feature. Gas leaving connection 24 of cyclone separator 20 may contain entrained particulate matter. The gas with any entrained particulate matter flows through conduit 32 into inlet 36 of baghouse 34. The entrained particles settle toward outlet 38 of baghouse 34 or are alternatively deposited on filter bags 40. The filtered air, or other conveying gas, passes through the interior of filter bags 40 to outlet 42 of filter 34. The bags are cleaned by a reverse pulse or air or other gas through header 41. Conduit 46 connects outlet 42 to the inlet 48 of blower 50.

Those skilled in the art will appreciate that the size and speed requirements of the blower are to a great extent dictated by the required material tranfer rate, the required transfer distances, and the resistance to flow of the system components. Blower 50 may be of several known constructions and can be driven by an electric motor or an equivalent source of rotary power. In many applications, blower 50, which comprises a portion of transfer unit means T, is located adjacent a railroad siding or truck unloading facility as is centrifugal cyclone separator 20 and rotary valve 30. In such applications, blower 50 may be driven by a stationary engine (not shown). The engine/drive combination can permit operation of blower 50 at several speeds, as desired.

Conduit 52 is connected to outlet 54 of blower 50. A suitable pressure relief device 56 is shown schematically in conduit 52. Pressure relief device 56 may be of any suitable construction and is designed to relieve excess pressure in blower 50 in the event of plugging of particulate materials in conduit 52 or conduits further downstream. In the event of a rapid rise in pressure, relief valve 56 allows gas to pass to the atmosphere via conduit 58 to avoid mechanical damage to blower 50.

Rotary valve 30 discharges particulate material into a plenum 60 which is preferably a specially adapted section of pipe suitable for connection to rotary valve 30 as well as conduit 52. A material outlet connection 62 is provided on plenum 60. Accordingly, transfer unit means T preferably has a first connection 22 subjected to vacuum via the action of blower 50 and a second connection 62 under pressure from the same blower 50.

When using the apparatus and method of the present invention in unloading only identical or compatible materials wherein cross-contamination is not a problem, filter 34 may be employed to remove any entrained particulate materials from conduit 32 before the circulating gas is returned to blower 50 via conduit 46. As shown in the figure, the particulate materials removed by filter 34 can preferably be returned through rotary valve 39, via conduit 64, to transport container H. Alternatively, the particulate materials removed by filter 34 can be routed through conduit 64 but into cyclone separator 20. As shown in the dashed lines in the drawing, conduit 64 can be connected to separator 20 as an alternative to the connection to transport container H.

On the other hand, when the apparatus and method of the present invention are used to transfer differing materials where cross-contamination is a factor, filter 34 and its associated piping, conduits 64 and 46, are eliminated and conduit 32 is made to extend from fluid outlet 24 directly into inlet 48 of blower 50. The filter 34 is eliminated due to the problems inherent in effectively washing out particulate materials of one specification before the apparatus or method is employed to transfer a different material of incompatible properties.

As shown in the figure, material is pulled by the vacuum created by blower 50 through conduit 28 into cyclone separator 20. The overhead stream from cyclone 20 then passes into inlet 48 of blower 50 either directly or through filter 34, depending on the application, whereupon blower 50 generates a positive pressure in conduit 52. The flowing gas stream propels particulate materials discharged by rotary valve 30 past outlet 62 and into conduit 66. Conduit 66 extends between outlet 62 and inlet 68 of separator means B. Separator means B is preferably a centrifugal cyclone separator 70 although other types of mechanical separation devices can be employed without departing from the spirit of the invention. Cyclone separator 70 has an inlet 68, a particulate material outlet 72 and a fluid outlet 74. Particulate material outlet 72 is in fluid communication with inlet 76 of supply bin S preferably through rotary valve 81 or equivalent. In applications where material cross-contamination is not a problem, fluid outlet 74 is connected to filter 78 via conduit 79. Filter 78 may be any type of mechanical separation device or a wet type separation device but is preferably a reverse pulse type baghouse similar in operation to filter 34. A rotary valve 80 or an equivalent type of material flow regulation device is mounted to outlet 82 of filter 78. The particulate material separated within filter 78 flows through rotary valve 80 and into supply bin S through conduit 84. The filtered fluid exits filter 78 through outlet 86 and flows through conduit 88 back to discharge manifold 16.

It should be noted that for applications wherein cross-contamination from many products is a factor, filter 78 can be eliminated and conduit 88 is made to extend from fluid outlet 74 of cyclone separator 70 to discharge manifold 16 on the transport container H. As seen in the figure, conduit 88 preferably enters manifold 16 on the opposite end 89 from the connection for conduit 28.

Vent means V preferably comprises a conduit 90 which extends from the top of supply bin S to the top of the transport container H. As can be readily appreciated from the figure, operation of blower 50 places supply bin S under a positive pressure. To avoid overpressuring supply bin S, conduit 90 is appropriately sized in consideration of the cubic feet per minute of air being circulated by blower 50 and other operational parameters. It should be noted that the bulk of the circulating air exits separator means B through conduit 88 while excess air in supply bin S is relieved back to transport container H through line 90. It will further recognized that the possibility exists for air to be pulled into the system in the vacuum phases of the closed conveying loop. For example, conduit 28, separator 20, conduit 32, and conduit 46 all operate under a pressure lower than the surrounding atmospheric pressure. Therefore, any looseness in any of the joints will result in ingress of atmospheric air into the system. Alternatively, air can be pulled into the system with the product as it falls into manifold 16. This air entering the system will have to be removed from the circulating loop in order to maintain a balance of air circulating in the system. Vent conduit 90 can alternatively be replaced by a line routed from conduit 88 adjacent discharge manifold 16 and into the top of transport container H, see conduit 92 (shown in dashed lines) in the figure. Although excess air can escape from the system from conduit 88 by percolation through the particulate material P within discharge manifold 16, it will be readily appreciated that the path of lesser resistance will be through alternative conduit 92 which is connected into the top of transport container H.

The venting of supply bin S via conduit 90 or alternative conduit 92 results in a slight pressure build up within transport container H which is relieved by vent opening 94. Vent opening 94, which can be a roof hatch on a hopper car or truck, is in fluid communication with filter 96 which separates entrained particulate matter from the emerging gas stream and allows the filtered gas to escape to the atmosphere via outlet 98. Filter 96 may be of the identical construction as filters 34 or 78 (but having a smaller filtering capacity) with a suitable rotary valve 100, or equivalent, discharging the particulate material back into the roof of transport container H through another vent opening 102. Although a reverse pulse type baghouse is illustrated in the figure, the filtration device 96 can be of far simpler construction. It has been shown in the field that when handling granular or powdered materials that a porous membrane such as a filter sock having appropriately sized openings thereon, may be attached over vent opening 94 which will allow excess gases to escape transport container H and simultaneously allow filtered particulate materials to drop back into transport container H. It is preferred that, independent of the type of materials being unloaded from transport container H, a filter 96 be applied to opening 94 to protect the environment. The use of a sock filter stretched over a roof hatch of transport container H has the inherent advantages of easy cleaning or quick change-out to avoid contamination from other products.

In operation, slide gate 18 is preferably opened after the start up of blower 50. As a result, particulate materials are conveyed under vacuum through conduit 28 into cyclone separator 20. The particulate materials drop through rotary valve 30 whereupon the pressure generated by blower 50 conveys the particulate materials drop cyclone separator 70. Substantially all the particulate materials drop from cyclone 70 through inlet 76 of supply bin S. The overhead stream from cyclone 70 is connected via conduit 88 which extends between outlet 74 and discharge manifold 16.

In applications that do not employ filter 78, any entrained particulate materials in the fluid stream emerging from outlet 74 are carried through conduit 88 back to discharge manifold 16 wherein they are combined with the incoming particulate material stream from transport container H and once again transported via the above-described system toward supply bin S.

Venting of supply bin S preferably occurs through conduit 90 back into transport container H. As a result, any entrained particulate materials in conduit 90 are deposited back in transport container H for ultimate recirculation, in the pneumatic conveying system, back to supply bin S. Filtering the gas vented from transport container H results in further saving of particulate materials, as the filtered materials drop back into the transport container H before any gas is vented.

The apparatus and method of the present invention, allow a transport container H to be unloaded into a supply bin S with a minimum of product loss. This is especially so for systems requiring handling of different and incompatible products. In such systems, the apparatus and method of the present invention through the use of merely one filter above transport container H permits transfer of substantially all the contents of a transport container H into a supply bin S. Apart from minimizing the use of filters, which facilitates system cleanout between products, the apparatus and method of the present invention provides for regulation between the pressure and vacuum zones within the system without the use of complicated inline devices which could potentially plug during operations. When using the apparatus and method of the present invention for repeated transfers of an identical product, the addition of filters 34 and 78 further enhance product recovery.

The foregoing disclosure and description of the invention are illustrative and explanatory thereof, and various changes in the size, shape and materials, as well as in the details of the illustrated construction may be made without departing from the spirit of the invention.

I claim:

1. A closed loop pneumatic conveying system for transferring granular and powdered particulate materials from a transport container having a discharge manifold and a vent opening thereon, to a supply bin comprising:

transfer unit means, having a first and second connection, for generating a vacuum at said first connection and pressure at said second connection;

first conduit means for connecting a discharge manifold on the transport container to said first connection of said transfer unit;

separator means mounted to the supply bin having an inlet, a particulate outlet and a fluid outlet for separating particulate material, from an incoming fluid-particulate material stream, through said particulate outlet into the supply bin;

second conduit means for connecting said second connection of said transfer unit to said inlet of said separator means for transfer of particulate material under pressure;

said transfer unit means further comprising conveying means to separate said transfer unit means into a pressure zone, connected to said second conduit, and a vacuum zone, connected to said first conduit, and to allow particulate materials to flow from said vacuum to said pressure zone;

third conduit means for connecting said fluid outlet of said separator means to the discharge manifold on the transport container thereby closing a loop, said third conduit means being devoid of flow controlling elements therein; and means for venting the supply bin into the transport container.

2. The apparatus of claim 1 wherein:
said vent means is a pipe extending from the upper end of the supply bin to the vent opening connection on the transport container.

3. The apparatus of claim 1 wherein:
said vent means is a pipe extending from said third conduit at a point adjacent the discharge manifold of the transport container, to the vent opening on the transport container.

4. The apparatus of claim 2 further including:
first filtration means having an inlet mounted in fluid communication with the vent opening on the transport container for capturing particulate matter for return to the transport container and for allowing excess fluid in the loop to be exhausted from the transport container.

5. The apparatus of claim 4 wherein:
said third conduit means is connected to the opposite end of the discharge manifold of the transport container than said first conduit means.

6. The apparatus of claim 4 further including:
second filtration means in said third conduit means for capturing particulate material emerging from said fluid outlet of said separator means and returning the particulate material to the supply bin.

7. The apparatus of claim 6 wherein said transfer unit means further comprises:
a first cyclone separator having an inlet, a fluid outlet and a particulate outlet;
said first conduit connected to said inlet of said first cyclone separator;
a blower having an inlet and an outlet;
an overhead pipe connecting said blower inlet with said fluid outlet of said first cyclone separator;
said conveying means further comprising a rotary valve mounted adjacent said particulate outlet of said first cyclone separator;
a discharge pipe extending from said blower outlet and having said second connection on the opposite end thereof, said rotary valve discharging particulate materials into said discharge pipe.

8. The apparatus of claim 7 wherein said overhead pipe further includes:
third filtration means for capturing and removing particulate materials from said overhead pipe and returning them to the transport container.

9. The apparatus of claim 7 wherein said third filtration means returns particulate materials to said first cyclone separator.

10. The apparatus of claim 9 wherein said separator means mounted to said supply bin comprises a second cyclone separator.

11. The apparatus of claim 10 wherein said first, second and third filtration means each further comprise:
a filter baghouse having an inlet, a particulate outlet, and a filtered fluid outlet; and
a rotary valve connected to said baghouse particulate outlet.

12. A method for unloading granular and powdered materials from a transport container into a supply bin comprising the steps of:
connecting a first cyclone separator inlet to a particulate material discharge connection of a transport container;
applying a vacuum to said first cyclone separator to pneumatically convey particulate matter from the discharge connection of the transport container into the first cyclone separator;
discharging particulate matter from the first cyclone separator through a valve into a pressure conveying line;
applying a pressure source to said pressure conveying line to pneumatically convey the particulate material in the pressure conveying line to a second cyclone separator mounted to the supply bin;
discharging particulate material from said second cyclone separator into the supply bin;
conducting fluid and particulate matter emerging from an overhead connection on said second cyclone separator into a conduit connected to said particulate material discharge connection of the transport container, wherein said conduit is devoid of flow controlling elements therein;
venting fluid and entrained particulate material from the supply bin into a connection on the transport container.

13. The method of claim 12 further comprising the step of:
venting the transport container to the atmosphere.

14. The method of claim 13 further comprising the steps of:
filtering the particulate material from the vented vent gases discharged from the transport container; and
returning the captured particulate materials from said filtering step to the transport container.

15. The method of claim 14, comprising the steps of:
filtering the particulate material from the gases flowing from the overhead connection of said second cyclone separator; and
returning filtered particulate materials from the overhead connection of said second cyclone separator to the supply bin.

16. The method of claim 15 further comprising the steps of:
filtering particulate material from a fluid stream emerging from an overhead connection of said first cyclone separator;
returning the filtered particulate materials from the overhead connection of said first cyclone separator to the transport container; and
returning the filtered fluid emerging from the overhead connection of said first cyclone separator to the inlet of said pressure source.

17. The method of claim 15 further comprising the steps of:

filtering particulate material from a fluid stream emerging from an overhead connection of said first cyclone separator;

returning the filtered particulate materials from the overhead connection of said first cyclone separator to the first cyclone separator;

returning the filtered fluid emerging from the overhead connection of said first cyclone separator to the inlet of said pressure source.

18. A method for unloading a transport container into a supply bin comprising the steps of:

connecting a first cyclone separator inlet to a particulate material discharge connection of a transport container;

applying a vacuum to said first cyclone separator to pneumatically convey particulate matter from the discharge connection of the transport container into the first cyclone separator;

discharging particulate matter from the first cyclone separator through a valve into a pressure conveying line;

applying a pressure source to the pressure conveying line to pneumatically convey the particulate material in the pressure conveying line to a second cyclone separator mounted to the supply bin;

discharging particulate material from said second cyclone separator into the supply bin;

conducting fluid and particulate matter emerging from an overhead connection on said second cyclone separator into a conduit connected to said particulate matter discharge connection of the transport container;

venting the conduit used in said conducting step into a vent connection on the transport container.

19. The method of claim 18 further comprising the step of:

venting the transport container to the atmosphere.

20. The method of claim 19 further comprising the steps of:

filtering the particulate material from the vented vent gas discharged from the transport container; and returning the captured particulate materials to the transport container.

* * * * *

UNITED STATES PATENT AND TRADEMARK OFFICE
CERTIFICATE OF CORRECTION

PATENT NO. : 4,695,205

DATED : September 22, 1987

INVENTOR(S) : Marc S. Levine

It is certified that error appears in the above-identified patent and that said Letters Patent is hereby corrected as shown below:

Column 3, line 63:

after "(not shown)", insert therefore "connected to blower 50 through a suitable drive (not shown)."

Column 10, line 20:

delete gas and insert therefore "gases"

Signed and Sealed this

Seventeenth Day of May, 1988

Attest:

DONALD J. QUIGG

Attesting Officer      Commissioner of Patents and Trademarks